(12) United States Patent
Laube Silva

(10) Patent No.: US 10,267,353 B2
(45) Date of Patent: Apr. 23, 2019

(54) BUSHING AND INTERNAL COMBUSTION ENGINE

(71) Applicants: Mahle Metal Leve S/A, Jundiai—Sp (BR); Mahle International GmbH, Stuttgart (DE)

(72) Inventor: Ednaldo Laube Silva, Indaiatuba (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 127 days.

(21) Appl. No.: 15/323,699

(22) PCT Filed: Jun. 24, 2015

(86) PCT No.: PCT/EP2015/064176
§ 371 (c)(1),
(2) Date: Jan. 3, 2017

(87) PCT Pub. No.: WO2016/001021
PCT Pub. Date: Jan. 7, 2016

(65) Prior Publication Data
US 2017/0138393 A1 May 18, 2017

(30) Foreign Application Priority Data

Jul. 4, 2014 (BR) .......................... 102014016685-8

(51) Int. Cl.
*F16C 9/02* (2006.01)
*F16C 9/04* (2006.01)
(Continued)

(52) U.S. Cl.
CPC .............. *F16C 9/04* (2013.01); *F16C 17/022* (2013.01); *F16C 23/041* (2013.01);
(Continued)

(58) Field of Classification Search
CPC .. F16C 9/02; F16C 9/04; F16C 17/022; F16C 23/041; F16C 23/043; F16C 33/10; F16C 33/1025; F16C 2360/22
See application file for complete search history.

(56) References Cited

U.S. PATENT DOCUMENTS 6,120,187 A * 9/2000 Ono .......................... F16C 9/04
384/273
6,648,513 B2 * 11/2003 Okamoto .................. F16C 9/04
384/192
(Continued)

FOREIGN PATENT DOCUMENTS

CN 102667198 A 9/2012
GB 2324838 A 11/1998
(Continued)

OTHER PUBLICATIONS

Chinese Office Action in the parallel Chinese Patent application No. 201580028618.1 dated Jun. 1, 2018.
(Continued)

*Primary Examiner* — Phillip A Johnson
(74) *Attorney, Agent, or Firm* — Fishman Stewart PLLC

(57) ABSTRACT

A bushing may include a support surface and a sliding surface having a perimeter midpoint. The sliding surface of the bushing may have a convex profile in relation to a cross section of the bushing. The convex profile may be offset from the perimeter midpoint of the sliding surface of the bushing.

20 Claims, 3 Drawing Sheets

(51) Int. Cl.
*F16C 17/02* (2006.01)
*F16C 23/04* (2006.01)
*F16C 33/12* (2006.01)

(52) U.S. Cl.
CPC .......... *F16C 23/043* (2013.01); *F16C 33/122* (2013.01); *F16C 33/124* (2013.01); *F16C 2240/50* (2013.01); *F16C 2360/22* (2013.01)

(56) References Cited

U.S. PATENT DOCUMENTS

| | | |
|---|---|---|
| 8,646,980 B2 | 2/2014 | Flores |
| 9,080,604 B2 | 7/2015 | Rossmanith et al. |
| 2002/0126924 A1 | 9/2002 | Okamoto et al. |
| 2013/0209012 A1* | 8/2013 | Rittmann .......... B23B 29/03492 384/129 |
| 2014/0177989 A1* | 6/2014 | Rossmanith .......... F16C 17/022 384/276 |

FOREIGN PATENT DOCUMENTS

| | | | | |
|---|---|---|---|---|
| JP | S54-57051 A | | 5/1979 | |
| JP | 2002-266848 A | | 9/2002 | |
| JP | 2002266848 A | * | 9/2002 | ................ F16C 9/04 |
| JP | 2014-516144 A | | 7/2014 | |
| WO | WO-2008072548 A1 | * | 6/2008 | ................ F16C 9/04 |

OTHER PUBLICATIONS

English translation of JP Office Action for JP-2017-519807, dated Dec. 25, 2018.

\* cited by examiner

BUSHING AND INTERNAL COMBUSTION ENGINE

CROSS-REFERENCE TO RELATED APPLICATIONS

This application claims priority to International Patent Application No. PCT/EP2015/064176, filed on Jun. 24, 2015, and Brazilian Patent Application No. BR 10 2014 016685 8, filed on Jul. 4, 2014, both of which are hereby incorporated by reference in their entirety.

TECHNICAL FIELD

The invention relates to bushings in general, and more specifically the invention relates to bushings for use in particular in high-performance internal combustion engines.

BACKGROUND

Internal combustion engines, such as engines that use the known Otto or diesel cycles, are widely known and commonly used in vehicles used for moving people and goods, such as motor cars, transport and cargo vehicles, including trucks and locomotives. In summary, these engines use a fuel with a high hydrocarbon content, such as fossil fuels or fuels from renewable sources, to transform thermal combustion energy into kinetic energy.

Nowadays, there is increasing concern to reduce emissions from internal combustion engines, which are responsible for a large part of the $CO_2$ released into the atmosphere. Climate change is one of today's key environmental challenges, with potentially serious consequences. This problem is being caused by intensification of the greenhouse effect, which is in turn related to the increased concentration of greenhouse gases (GHG), including carbon dioxide.

In recent years, in order to minimize the emission of gases that are harmful to the environment, such as carbon monoxide (CO), hydrocarbon gases (HC) and nitrogen oxides (NOx), as well as particulate matter and/or other greenhouse gases, a series of different technologies has been integrated into internal combustion engines. The reduction of gas emissions is related, inter alia, to increased thermal efficiency of the engine, and consequently the reduction of specific fuel consumption.

In this regard, the use of technologies such as electronic injection, catalyzers and particle filters is now fairly widespread, and they are practically mandatory in internal combustion engines. Other, more recent technologies, such as direct fuel injection, common rail for engines that use the diesel cycle, and the more extensive use of technologies that have been known for a long time, such as mechanical compressors or turbochargers, are also being used to increase energy efficiency and to meet increasingly stringent emissions standards.

Consequently, combustion engines are developing greater power for a given displacement volume of the piston in the cylinder, commonly referred to as specific power. The efficiency of an Otto-cycle combustion engine in the 1980s averaged 50 hp/L, whereas today this can easily exceed 100 hp/L. This means that the combustion pressure inside the cylinders has increased considerably, which also means that combustion engines are operating under greater mechanical stresses, higher revolutions, and higher temperatures. As such, the components of same also need to be dimensioned to withstand these harsher operating conditions in order to guarantee both the reliability of the assembly and the anticipated service life, currently estimated at around 300,000 km for Otto-cycle motor cars.

One of the components most subjected to the stresses generated by combustion engines are the bushings, used both in bearings such as the bearings of the crankshaft and of the camshaft, etc., and in the connecting rods, and they are used both as supports and to reduce friction. They usually have a two-part construction, i.e. they are formed by two semicircular parts that are superposed on the perimeter of the bearing or of the end of the connecting rod. Bushings are usually made of a softer material in order to reduce friction between such rotating components, and they can also facilitate assembly, withstand assembly misalignments and accommodate particles, as is well known to persons skilled in the art.

However, as mentioned above, the operating conditions of internal combustion engines are becoming increasingly severe, and bushings, which have to withstand the pressure exerted by the connecting rods and/or by the shaft assembled in the bearing, are subject to greater wear. This wear is usually more accentuated in the areas closest to the lateral extremities of the bushing, due to the reduced distribution of oil in these areas. Consequently, bushings usually have an orifice in the central portion of same to enable an oil flow.

Bushing wear is an unwanted effect, since it may lead to play that compromises engine performance, as well as oil leaks and/or consumption.

The present invention is intended to overcome these and other drawbacks.

SUMMARY

In the present description, the term "bushing" refers to a bush or sleeve used in the connection between the connecting rod and the crankshaft of an internal combustion engine and/or the piston and the connecting rod and/or in any bearing in an internal combustion engine, and it may be made of different materials, including bi-metal and tri-metal bushes. The terms "bushing", "sleeve", "lining" and "bush" have the same meaning in the present description.

Furthermore, in the present description, the term "high performance", used in relation to internal combustion engines, should be understood to mean an internal combustion engine in which the bushing is subjected to pressures equal to or greater than 50 MPa on at least one point of the internal or external surface of same.

Consequently, a first objective of the invention is to provide a bushing that is able to withstand the high-performance operating conditions of an internal combustion engine.

An additional objective of the present invention is to provide a bushing with greater wear resistance compared to the bushings in the prior art.

Another objective of the invention is to provide a bushing that enables enhanced distribution of the oil film when in operation, compared to the bushings in the prior art.

To achieve the aforementioned objectives, inter alia, the invention relates to a bushing, in particular intended for use in an internal combustion engine, that has a two-part construction, a support surface and a sliding surface, in which said sliding surface has a convex profile in relation to the cross section of said bushing, and in which said convex profile is offset from the perimeter midpoint of the sliding surface.

According to additional and/or alternative embodiments of the present invention, the following features may also be present, individually or in any technically possible combination:

said bushing is a bi-metal bushing,
said bushing is a tri-metal bushing,
said convex profile is arc shaped, in relation to the cross section of the bushing,
said convex profile is trapezoid shaped, in relation to the cross section of the bushing,
said position offset from the perimeter midpoint of the sliding surface is at an angle of between 10° and 25°, particularly between 14° and 18° and more particularly approximately 16°,
said position offset from the perimeter midpoint of the sliding surface is at an angle of between 25° and 55°, particularly between 30° and 50° and more particularly between 35° and 45°,
the height of said profile is between 2 and 20 µm, particularly between 3 and 15 µm, and more particularly approximately 10 µm,
the angular length of said profile is between zero and 90°, particularly between 20° and 70° and more particularly approximately 60°.

The invention also relates to an internal combustion engine that includes, among other elements typical of an internal combustion engine, at least one bearing and one connecting rod, in which the internal combustion engine also includes at least one bushing according to the invention.

BRIEF DESCRIPTION OF THE DRAWINGS

The objectives, advantages, effects, technical improvements and functional improvements of the present invention can be better understood from the following description of a specific embodiment, provided with reference to the attached figures. These figures are schematic and the dimensions and proportions of same may not correspond to reality, since they are merely intended to describe and illustrate the invention in an exemplary manner, and they do not establish any limits other than those defined in the claims below, in which:

DETAILED DESCRIPTION

The invention is described below in relation to the specific embodiments of same and with reference to the attached figures. Specific embodiments are described in detail and shown in the figures, on the understanding that they should be treated as examples of the principles of same, and are not intended to limit the invention exclusively to that which is illustrated and described in this description. The different teachings of the embodiments discussed below may be used separately or in any suitable combination having the same technical effects.

The bushing according to the present invention is particularly intended to be used in internal combustion engines, although it may also be used in any application that requires a bushing that combines the qualities of high wear resistance and withstanding high-load pressures. Moreover, the bushing according to the invention may particularly be used in a connecting rod of an internal combustion engine and/or in bearings, such as the bearing of the crankshaft, of the camshaft, etc.

Figure 1:
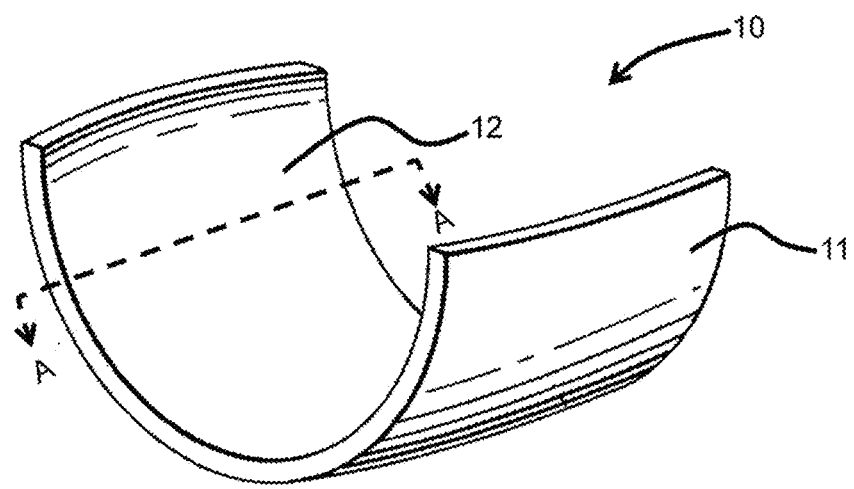
FIG. 1 is a schematic perspective view of a two-part bushing in the prior art.

FIG. 1 is a schematic perspective view of a bushing (10) in the prior art, having a two-part construction. As is known to persons skilled in the art, bushings have a surface (11) designed to be seated in the bearing or connecting rod, and an opposing surfaced (12) upon which the rotary part bears, referred to in the present document as the sliding surface. The bushing shown here is schematic, and other elements that may be associated with a bushing, such as orifices and channels designed for lubricating oil flow, flanges, etc. have been omitted for the sake of clarity.

Figure 2:
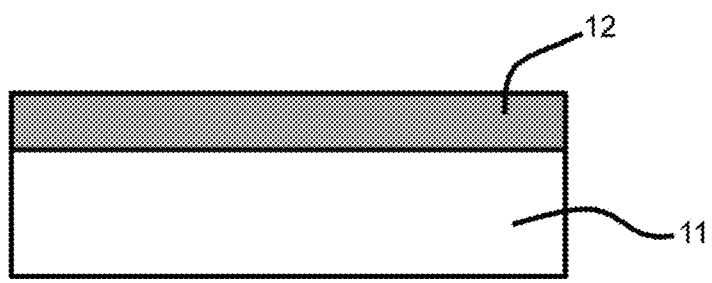
FIG. 2 is a schematic cross section along A-A of the bushing in FIG. 1.

FIG. 2 is a cross section of the bushing in FIG. 1. Bushings for use in internal combustion engines generally have a layer of carbon steel on the side of the supporting surface (11) lined on the internal diameter of same, on the side of the sliding surface (12), with a lead- and tin-based alloy (known as Babbitts or white metal) or an aluminum-based alloy combined with tin in varying concentrations, or a copper alloy containing different concentrations of lead. Bushings may also be tri-metal bushings including an intermediate layer. Additionally, the bushing may also have a polymer layer, with or without fillers, on the sliding surface. The material used in the bushing is not relevant for the purposes of the present invention.

Again in relation to FIG. 2, the bushings in the prior art have a flat sliding surface (12). The problem with bushings that have a flat sliding surface is that the oil film tends to be distributed to a lesser extent around the edges, resulting in greater wear in this area.

Figure 3:
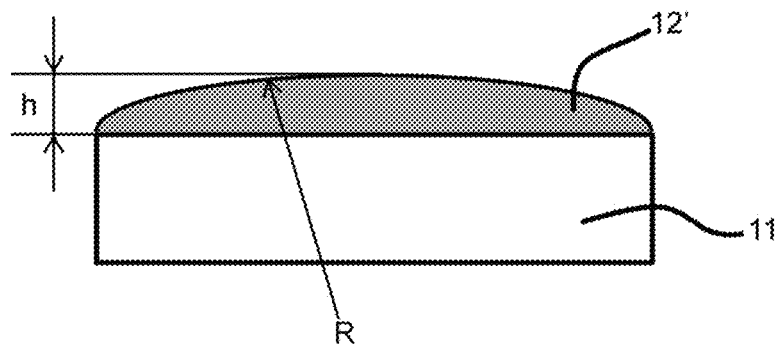
FIG. 3 is a schematic cross section of a bushing according to one embodiment of the invention, in the area where the profile is applied.

To overcome this problem, FIG. 3 discloses a first embodiment of the invention of a bushing shown schematically and in cross section. As shown, the invention proposes that the sliding surface (12') of the bushing have a convex profile in relation to the cross section of the bushing, i.e. an arched profile that, from the lateral extremity of the bushing, in relation to the cross section of same, forms a curve that reaches an apex at approximately the median position, before decreasing continuously to the opposite side. The radius of curvature (R) may vary provided that the difference in height (h) between the lowest point and the highest point of the profile is between 2 and 20 µm, particularly between 3 and 15 µm and more particularly approximately 10 µm.

Naturally, the term "convex" used here does not necessarily refer to a profile that has a cross section with a radius of curvature (R), but should be understood to mean a profile that projects radially inwards from the bushing, and may have any shape, both in the cross and longitudinal sections of same, provided that the profile enables there to be a difference in height (h) between the median portion and the sides of the bushing, across the cross section of same.

Figure 4:
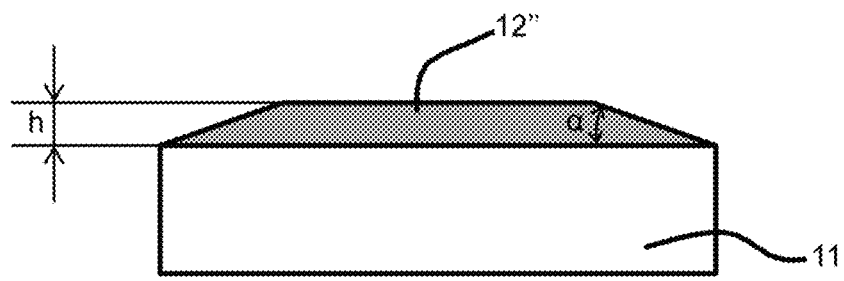
FIG. 4 is a schematic cross section of a bushing according to an alternative embodiment of the invention, in the area where the profile is applied.

In this regard, FIG. 4 is a schematic cross section of a bushing according to an alternative embodiment of the invention, in which the convex profile has a parallelepiped-shaped cross section, with lateral walls that project angularly upwards and a flat upper surface. As such, the angle of inclination (α) Of the lateral walls of the trapezoid shape may vary, provided that the height (h) between the lowest point and the highest point of the profile remains between 2 and 20 μm, particularly between 3 and 15 μm and more particularly approximately 10 μm.

Figure 5:
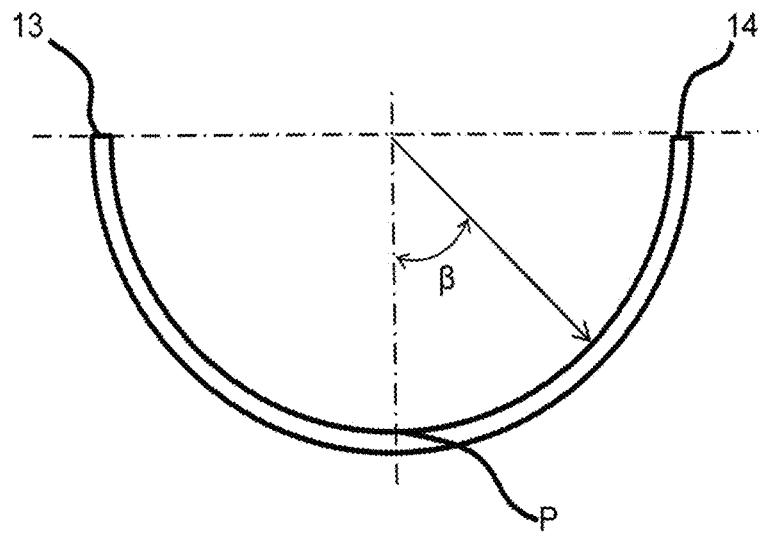
FIG. 5 is a side view of a bushing according to the invention showing an area where the profile may be applied.

Also in accordance with the embodiments of the invention, the profile shall preferably be positioned on the supporting surface in a position offset from the perimeter midpoint in relation to the extremities of the bushing. FIG. 5 is a schematic side view of a bushing, in which the perimeter midpoint (P) is understood to be the midpoint of the perimeter formed by the two extremities (13, 14) of the bushing, along the longitudinal plane of same. Accordingly, in a two-part bushing that has a full semicircle structure, the perimeter midpoint is at 90° from each of the extremities (13, 14).

This means that the profile does not need to be located on the perimeter midpoint (P), but offset angularly from same. Specifically, this angular offsetting (β) may be between 10° and 25°, particularly between 14° and 18° and more particularly approximately 16° from the perimeter midpoint (P) for bushings used in bearings. Alternatively, this angular offsetting (β) may be between 25° and 55°, particularly between 30° and 50° and more particularly between 35° and 45° from the perimeter midpoint (P) for bushings used in connecting-rod big ends.

Offsetting the profile in relation to the perimeter midpoint (P) is advantageous since it enables the profile to be located at the point where most pressure is normally exerted on the bushing, such that the profile encourages better distribution of the oil film over the sliding surface, thereby reducing or minimizing wear. As mentioned above, the point of greatest pressure is between 10° and 25°, particularly between 14° and 18° and more particularly approximately 16° from the perimeter midpoint (P) for bushings used in bearings and between 25° and 55°, particularly between 30° and 50° and more particularly between 35° and 45° from the perimeter midpoint (P) for bushing is used in connecting-rod big ends.

Figure 7:
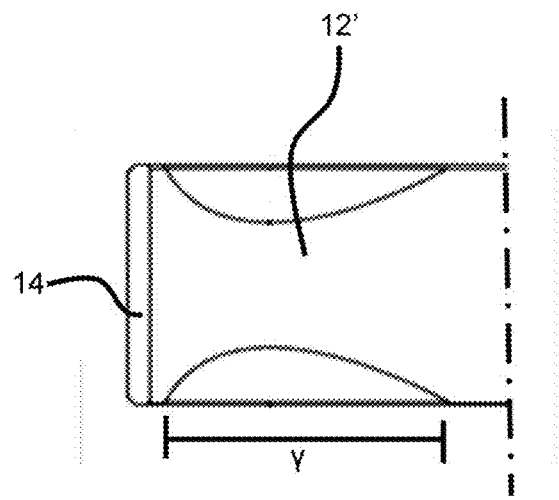
FIG. 7 is a partial top view of a bushing according to the invention showing an area where the profile may be applied.
Figure 6:
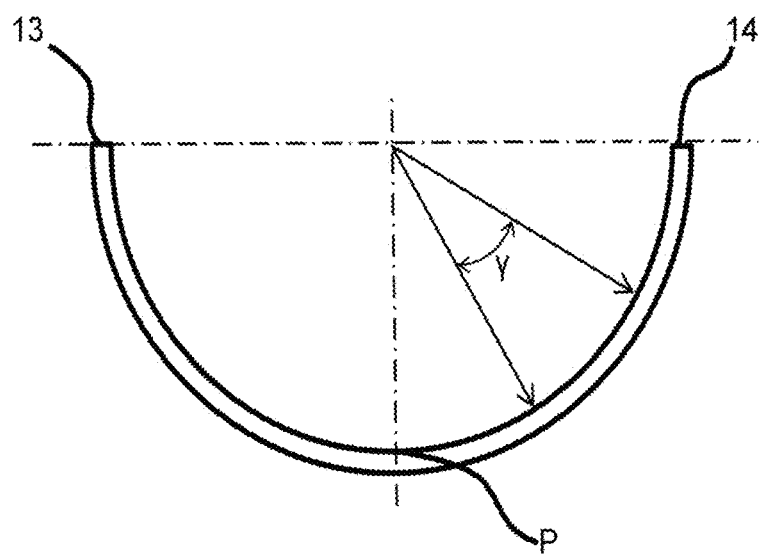
FIG. 6 is the same side view as FIG. 5, showing a possible angular length of the profile.

As such, the profile need not extend along the entire sliding surface (12', 12"), i.e. along the entire longitudinal length of the bushing along the sliding surface, but may be present in only a part of same, and the remainder of the sliding surface may have a flat profile, like the profile already known for bushings in the prior art. As such, FIG. 6 shows how the profile can extend through an angular length (γ) of 0 to 90°, particularly between 20° and 70° and more particularly approximately 60°. As such, the longitudinal section of the profile can also preferably have an arched or trapezoid shape, or a combination of different shapes, i.e. in which the profile has a longitudinally increasing section that reaches and apex approximately at the midpoint, before decreasing towards the end of the longitudinal length of same, as shown in FIG. 7.

Naturally, according to the schematic figures in the present description, the profile is shown in a given quadrant of the bushing, whereas the profile could be arranged in the opposing quadrant as a function of the intended use of the bushing. Consequently, the angles provided here should be understood to relate to the reference position and may, depending on this reference, have positive or negative values, or even values that are multiples of 360°, i.e. depending on the initial reference, an angle of 30° may be represented as 60°, 90°, 120°, 150°, 180°, etc., as is evident to person skilled in the art. Naturally, the values set out here in degrees can also be expressed in radians.

Although the invention has been described in relation to the specific embodiments of same, persons skilled in the art could carry out alterations or combinations not contemplated above without thereby moving outside the scope of the teachings described herein, in addition to extending application of same to other applications not considered in this description. Consequently, the attached claims should be understood to cover any equivalents compatible with the principles of the invention.

The invention claimed is:

1. A bushing comprising:
a support surface; and
a sliding surface having a perimeter midpoint;
wherein said sliding surface has a convex profile in relation to a cross section of said bushing; and
said convex profile is offset from said perimeter midpoint of the sliding surface.

2. The bushing as claimed in claim 1, wherein said bushing is a bi-metal bushing.

3. The bushing as claimed in claim 1, wherein said bushing is a tri-metal bushing.

4. The bushing as claimed in claim 1, wherein said convex profile is arc-shaped in relation to the cross section of the bushing.

5. The bushing as claimed in claim 1, wherein said convex profile is trapezoid-shaped in relation to the cross section of the bushing.

6. The bushing as claimed in claim 1, wherein said offset from the perimeter midpoint of the sliding surface is at an angle of between 10° and 25°.

7. The bushing as claimed in claim 1, wherein said offset from the perimeter midpoint of the sliding surface is at an angle of between 25° and 55°.

8. The bushing as claimed in claim 1, wherein the height of said convex profile is between 2 and 20 μm.

9. The bushing as claimed in claim 1, wherein said convex profile has an angular length of 0 to 90°.

10. The bushing as claimed in claim 1, wherein said offset from the perimeter midpoint of the sliding surface is at an angle of between 14° and 18°.

11. The bushing as claimed in claim 1, wherein said offset from the perimeter midpoint of the sliding surface is at an angle of approximately 16°.

12. The bushing as claimed in claim 1, wherein said offset from the perimeter midpoint of the sliding surface is at an angle of between 30° and 50°.

13. The bushing as claimed in claim 1, wherein said offset from the perimeter midpoint of the sliding surface is at an angle of between 35° and 45°.

14. The bushing as claimed in claim 1, wherein the height of said convex profile is between 3 and 15 μm.

15. The bushing as claimed in claim 1, wherein the height of said convex profile is approximately 10 μm.

16. The bushing as claimed in claim 1, wherein said convex profile has an angular length between 20° and 70°.

17. The bushing as claimed in claim 1, wherein said convex profile has an angular length of approximately 60°.

18. An internal combustion engine comprising:
at least one bearing;
a connecting rod; and
at least one bushing having:
a support surface; and
a sliding surface having a perimeter midpoint;
wherein said sliding surface has a convex profile in relation to a cross section of said bushing; and
said convex profile is offset from said perimeter midpoint of the sliding surface.

19. The internal combustion engine as claimed in claim 18, wherein said bushing is a bi-metal bushing.

20. A bushing comprising:
a support surface; and
a sliding surface having a perimeter midpoint;
wherein said sliding surface has an arc-shaped convex profile in relation to a cross section of said bushing;
wherein said bushing is one of a bi-metal bushing and a tri-metal bushing; and
wherein the convex profile has a radius of curvature such that a highest point of the convex profile occurs at a midpoint of the convex profile in an axial direction.

* * * * *